June 1, 1965 K. C. HAAS ETAL 3,186,366

NEEDLE POSITIONING CONTROL MECHANISM

Filed Feb. 6, 1962 6 Sheets-Sheet 1

INVENTORS
KENNETH C. HAAS
MALCOLM SPINRAD
BY
ATTORNEY

June 1, 1965 K. C. HAAS ETAL 3,186,366
NEEDLE POSITIONING CONTROL MECHANISM
Filed Feb. 6, 1962 6 Sheets-Sheet 2

INVENTORS
KENNETH C. HAAS
MALCOLM SPINRAD
BY
ATTORNEY

INVENTORS
KENNETH C. HAAS
MALCOLM SPINRAD
BY
ATTORNEY

INVENTORS
KENNETH C. HAAS
MALCOLM SPINRAD
BY
ATTORNEY

INVENTORS
KENNETH C. HAAS
MALCOLM SPINRAD
BY
ATTORNEY

United States Patent Office 3,186,366
Patented June 1, 1965

3,186,366
NEEDLE POSITIONING CONTROL MECHANISM
Kenneth C. Haas, Mohnton, and Malcolm Spinrad, Reading, Pa., assignors to American Safety Table Company, Inc., Reading, Pa., a corporation of Pennsylvania
Filed Feb. 6, 1962, Ser. No. 171,524
12 Claims. (Cl. 112—219)

This invention relates generally to intermittently operated utilities and particularly to a power transmission organization operative to terminate operation of the utility when the moving parts thereof are in a predetermined position.

Our invention may be applied to a wide variety of devices in many different fields, however, one field of application is that of the garment industry wherein power sewing machines are widely used. Generally, in such application, it is required that the sewing machine be intermittently operated with the periods of nonoperation affording an opportunity to shift the position of the item being stitched. In such case, it is most desirable that the needle be in its down position so that the work may be readily turned about it. Sometimes, of course, it is more desirable that the needle be in the up position so that the work may be readily removed from the sewing machine. Hand operation of the balance wheel to achieve desired needle positioning is very time consuming and can represent an appreciable fraction of the labor cost involved in producing a garment. It is therefore a great benefit to the garment industry, and ultimately to the consumer, that labor costs be reduced in the production of stitched articles by eliminating the time wastage associated with the manual positioning of the sewing machine needle.

In the past, needle positioning mechanisms have been devised for causing a sewing machine needle to stop in the up position or in the down position, but all such mechanisms operate in such manner as to advance the work through the sewing station. That is, if the needle is down and it is desired to raise the same to release the work, the needle positioning mechanism raises the needle by advancing the work by a half stitch. While this may be generally satisfactory, there are cases where it is not, as for example when the sewing machine is of the chain-stitch type. In this case, raising of the needle by advancing the work does not release the thread lock, and the work can not be moved out from under the needle. In order to unlock the thread so that the work may be removed it is necessary to raise the needle by reverse rotation of the spindle shaft to thereby effectively cause a back-stitching motion of one half stitch. Of course, no actual back-stitching takes place because the needle merely rises and stops. Presently known needle positioning devices are incapable of producing needle raising by a back-up or reversing action of the needle drive and therefore are unusable with the class of sewing machines and other devices requiring such operation. Accordingly, it is a primary object of this invention to provide a novel needle positioning control mechanism operative to control a power transmission for driving a utility such as a sewing machine so that the working parts of the utility may be selectively moved to at least two different predetermined positions, the different positions being arrived at by motion of the parts in opposite sense from any chosen reference position.

Another object of our invention is to provide a control circuit for a power transmission utilized for driving a utility such as a sewing machine during its normal operation, the control circuit being inoperative during normal operation but being rendered automatically operative thereafter to move the working parts of the utility to one of several predetermined positions.

Still another object of our invention is to provide a power transmission control circuit which exhibits a rapid positive action and affords accurate positioning control of the power transmission.

A further object of our invention is to provide a power transmission and control circuit for a sewing machine which automatically places the needle in a first predetermined desired position upon termination of a stitching operation, and which allows the needle to be automatically moved to a second predetermined needle position by reversing the needle drive under the control of the machine operator.

It should be understood that although our invention is described for purposes of illustration in connection with a power sewing machine, the principles involved are generally applicable to a wide variety of devices, and those other applications will be apparent to persons normally skilled in the art. Accordingly, these and other objects and advantages of our invention will appear more fully hereinafter from an examination of the detailed description and appended drawings, wherein.

Figure 4:
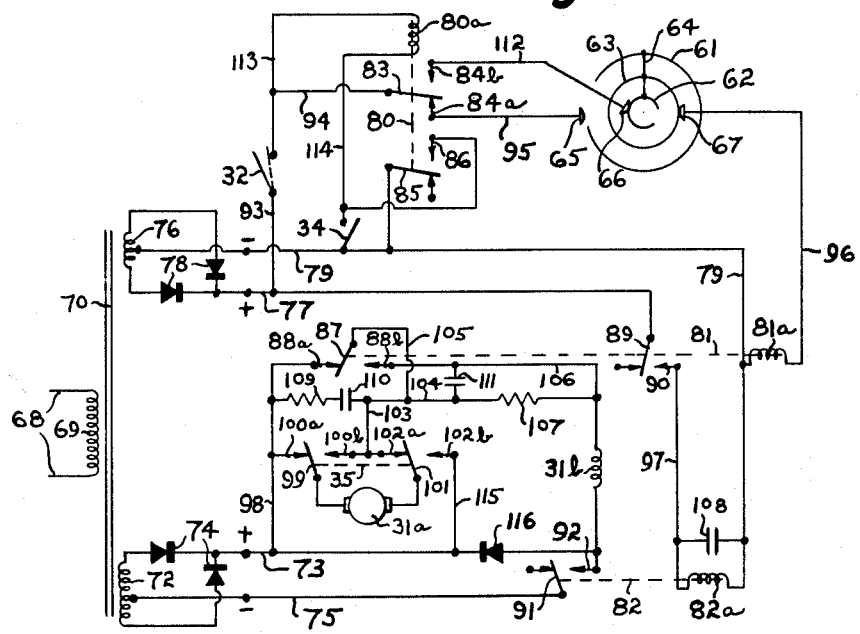
FIGURE 4 is a schematic wiring diagram illustrating a typical control circuit for establishing predetermined needle positions of a sewing machine or other mechanical device.
Figure 5:
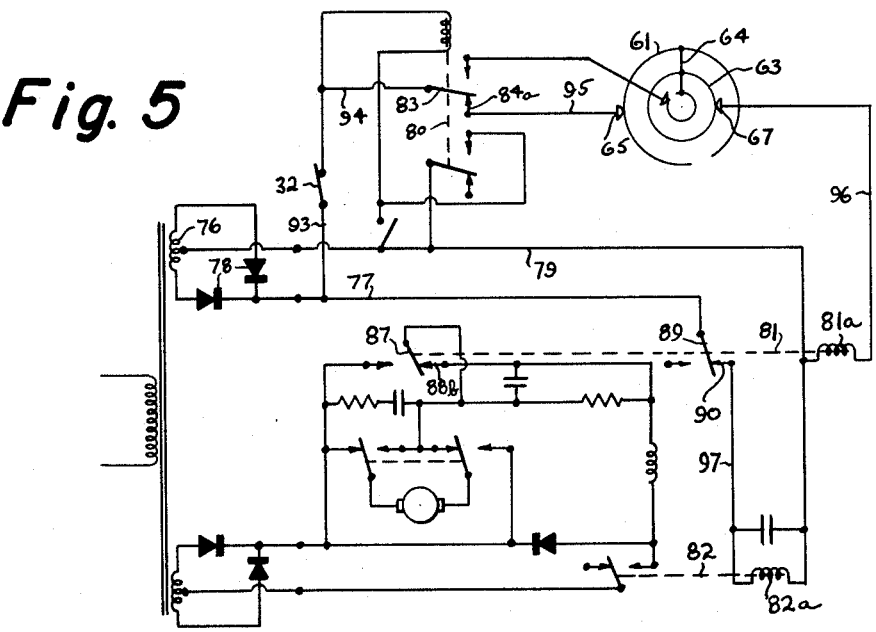

FIGURES 5 through 12 inclusive are schematic diagrams similar to that of FIGURE 4 but which illustrate the control circuit in various phases of its operation.

In the several figures like elements are denoted by like reference numerals.

Figure 1:
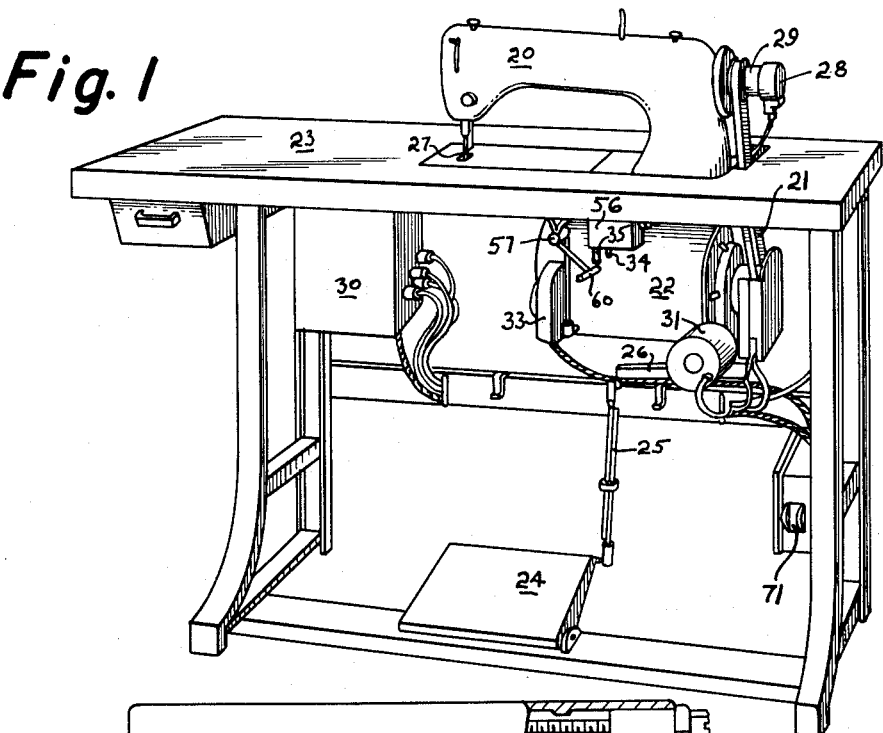
FIGURE 1 is a perspective view of a sewing machine of the manufacturing type constructed in accordance with and embodying the general principles of the present invention.
Figure 2:
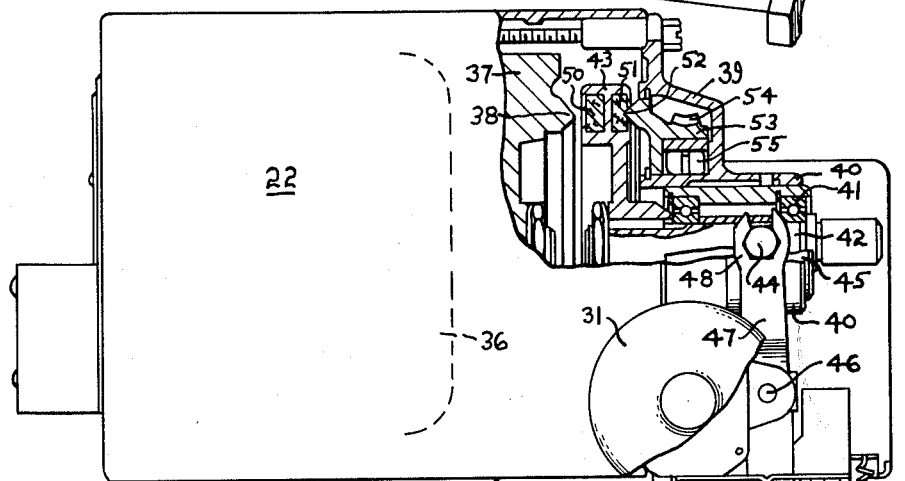
FIGURE 2 is an enlarged front elevation of the power transmission mechanism with parts broken away, sectioned, or omitted for the sake of clarity.
Figure 2:
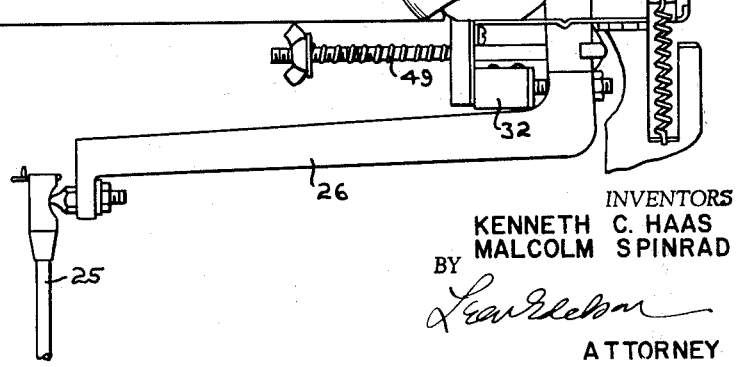
Figure 3:
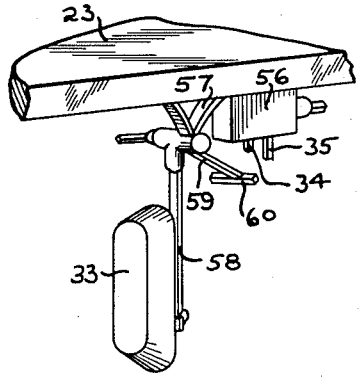
FIGURE 3 is a perspective view of a knee-operated switch for controlling the needle positioning mechanism associated with the sewing machine.

Before describing in detail the operation of the positioning control mechanism, it will be conducive to a more complete understanding if the general functions and organizational interrelations of the entire apparatus be first explained. Referring to FIGURES 1, 2 and 3, FIGURE 1 shows a sewing machine 20 which may be driven by a belt 21 from a power transmission unit 22 mounted beneath the table 23. The power transmission 22 includes a constantly rotating motor which drives the spindle of the sewing machine 20 through the medium of a clutch mechanism. The clutch mechanism, is engaged by foot depression of the treadle 24 which causes the linkage 25 and 26 to shift that part of the clutch which carries the belt 21 into engagement with the rotating motor. Upon release of the treadle 24, the belt carrying portion of the clutch mechanism is disengaged from the motor and engages a brake which stops the belt 21 and hence the spindle of the sewing machine.

In order to accomplish positioning of the sewing machine needle 27 at a predetermined point when the clutch is disengaged by release of the treadle 24, several other components are required. These components basically consist of a needle position sensing device, an auxiliary drive for the belt 21, and a control circuit for the auxiliary drive. The sensing device utilized is the element 28 affixed to the sewing machine spindle by an adapter 29 and is hereinafter called a synchronizer. The synchronizer senses the needle position when the sewing machine is in the process of being stopped and operates on the control circuit which in turn operates on the auxiliary drive to insure that the sewing machine needle 27 stops in the desired position. The control circuit is shown in FIGURE 1 as included within the housing 30 affixed to the left underside of the table 23. The auxiliary drive includes the auxiliary motor 31 which is coupled to the clutch mechanism through the brake mechanism, and so is effectively coupled to the belt 21. The synchronizer 28, control circuit (in housing 30), and auxiliary motor 31 are electrically connected through a cabling arrangement.

Several manually operable switches form an integral part of the control circuit but these switches are not located within the housing 30. One of the switches is operated by the treadle 24 and is hereinafter called the treadle switch 32 (best seen in FIGURE 2) while the other switches are operated by a knee pad 33 and are hereinafter called the reversing switches 34 and 35 (seen in FIGURES 1 and 3). The treadle switch determines the time at which the synchronizer will be allowed to control the sewing machine needle position, while the reversing switches change the control circuit conditions so that a particular one of several predetermined needle stop positions may be selected and achieved by reversing of the auxiliary motor drive.

FIGURE 2 shows the main aspects of the power transmission, and it will there be seen that the power transmitting organization 22 comprises a principal electric motor 36 having a shaft which is extended to receive thereon a flywheel 37, the latter being suitably keyed to the motor shaft for rotation therewith. Formed on the face of the flywheel 37 which is remote from the motor 36 is an annular rib 38. The motor 36 and its associated flywheel 37 are carried as an assembly by a supporting housing 39, within which housing the assembly is axially adjustably fixed so that the flywheel 37 is centered within the housing and is free to rotate therewithin.

Extending centrally through the end wall of the housing 39 and axially shiftable therewithin is a cylindrical journal box 40, and fitted within the latter is a ball-bearing assembly 41 which rotatably receives a shaft 42. Mounted respectively on opposite ends of the shaft 42 are a clutch disc 43 and a belt pulley (not shown). The journal box or housing 40 for the ball-bearing assembly 44 is provided at diametrically opposite sides thereof with openings through which respectively project a pair of studs 44 suitably secured to diametrically opposite sides of the external sleeve of the ball-bearing assembly 41, designated 45. It will be understood, of course, that the clutch disc 43 and the belt pulley are each non-rotatably secured to the shaft for rotation therewith and that the clutch disc 43 and belt pulley shaft 42 and ball-bearing assembly 41 are axially shiftable as a unit within the relatively stationary journal box 40. Pivotally secured to the housing 39, as at 46, is the clutch-actuation lever 26, this lever being provided at its upper end with a yoke portion that has laterally spaced arms 47 which embrace the journal box 40. The arms 47 are each provided with a slotted terminal end 48 for engagement with the stud 44 previously described that projects outwardly through an opening in the side wall of the journal box 40.

The lever 26 is under the influence of a spring 49 which normally holds the lever in its position as shown, in which position the clutch disc 43 is disengaged from the flywheel 37 of the motor 36. The lower arm of the pivoted lever designated 26, is suitably connected, as by a link 25, to the foot treadle 24 (as seen in FIGURE 1) for actuation of the lever, it being noted that a downward pull upon the link 25 shifts the yoke portion of the lever 26 toward the motor 36 and so causes the clutch disc to engage the annular rib 38 of the motor flywheel 37. The clutch disc 43 is provided adjacent its peripheral edge with a pair of oppositely facing annular friction discs 50 and 51 of cork or other suitable resilient material, these discs being adapted for alternative engagement respectively with the annular rib 38 of the flywheel 37 and an annular rib 52 formed upon a revoluble brake member designated generally by the numeral 53.

This brake member 53 comprises a centrally apertured web portion fitted over the inner end portion of the journal box 40, an inner rim portion that carries the annular rib 52 and an outer rim portion that has formed thereon worm gear engaging teeth 54. Between the web of the revoluble member 53 and the journal box 40 is a roller-bearing assembly 55 which carries the revoluble member 53 for rotation about the journal box 40. The revoluble brake member 53 is a component part of the auxiliary drive assembly. Extending horizontally immediately beneath and in substantial tangential relation to the revoluble brake 53 is a worm shaft (not shown) having a spiral groove which meshes with the teeth 54 on the rim of the revoluble member 53. One end portion of the worm shaft is journalled in a bushing (not shown) suitably carried by the housing 39, while the opposite portion of the shaft is coupled to the shaft of the auxiliary motor 31.

When the treadle 24 is released, the clutch 43 disengages from the flywheel 37 and shifts to the right to engage the revoluble brake member rib 52. The revoluble brake member 53 is of course locked against rotation by the teeth 54 intermeshed with the worm gear coupled to the shaft of the auxiliary motor 31, which latter is motionless because the motor 31 is de-energized, as will be subsequently seen. The sewing machine spindle shaft drive belt 21 is thus subjected to braking action which it transmits to the needle 27 through the spindle shaft. Needle positioning is carried out in the manner to be described by energizing the auxiliary motor 31 to revolubly drive the brake member 53 through the worm gear, and thereby drive the spindle shaft drive belt 21 through the clutch disc 43.

Energization of the auxiliary motor 31 is automatically controlled by the circuit interconnected synchronizer 28 and treadle switch 32. The treadle switch 32 is opened by the linkage lever 26 during normal stitching to thereby disable the synchronizer 28 and motor 31 and is closed by release of the treadle 24 to permit energization of the motor 31 through the synchronizer. The synchronizer 28 includes a brush and split-ring structure which determines the needle position and dictates whether or not the motor 31 need be energized by the control circuit to position the needle 27, and precisely when the motor should be de-energized thereafter to stop the needle in the desired position.

The manually controllable reversing switches 34 and 35 determine in which position the needle shall stop. These switches are connected into the control circuit in the illustrative examples so that the needle will stop in its down position if the switches are not manually actuated, but will cause the needle to be stopped in its up position when actuated and will effect this result by reversing the auxiliary motor drive to counter rotate the revoluble brake member 53 to produce a backstitch.

The reversing switches are shown in FIGURES 1 and 3 contained within a housing 56 secured to the underside of the table 23. Likewise secured to the underside of the table top 23 is a bracket 57 that pivotally carries a lever for actuating the reversing switches, the lever being provided with a pair of angularly related arms 58 and 59. The arm 59 is provided with a terminal portion 60 that registers with and is normally disposed in lower spaced relation to the switches 34 and 35, and the arm 58 is fitted with the knee pad 33. The switches 34 and 35 are so arranged that striking of the knee pad 33 by the operator causes the lever terminal portion 60 to first actuate switch 35 and then actuate switch 34. Immediately upon release of the knee pad 33, it returns to its initial position by reason of its own weight and so restores the switches 34 and 35 to their deactuated condition. It will be understood that when the terminal portion 60 of the arm 59 swings into contact with the reversing switches, the presser foot of the stitch forming mechanism may be raised by means associated with the knee pad lever.

The raising of the presser foot would be required, for example where the actuation of the reversing switches causes the needle 27 to be stopped in its up position so that the work may be readily removed from the machine. For purposes of illustration hereinafter it will be assumed that actuation of the reversing switches 34 and 35 causes the needle 27 to be stopped in its up position, and that non-actuation of these switches causes the needle 27 to be stopped in its down position. The circuitry of FIGURES 4 through 12, to be described, is so arranged that the foregoing assumed action is achieved.

Turn now to a consideration of FIGURE 4. Except for the synchronizer 28, the auxiliary motor 31, the treadle switch 32, and the reversing switches 34 and 35, all of the component parts illustrated in FIGURE 4 are contained within the housing 30 illustrated in FIGURE 1 affixed to the underside of the table 23. The synchronizer 28 shown in FIGURE 1 is represented diagrammatically in FIGURE 4 by the revoluble triple ring and fixed position brush structure located in the upper right hand portion of the latter figure. The outer or "down" position split ring is designated as 61 and has associated therewith a contact brush 65, the inner or "up" position split ring is designated as 62 and has associated therewith a contact brush 66, and the center or common collector ring 63 has associated therewith a contact brush 67, all three rings being electrically connected together by means of the shorting bar 64. The synchronizer rings 61, 62 and 63 are fixed to and rotatable with the sewing machine spindle shaft while the brushes 65, 66 and 67 are fixed in position so that the rings are rotatable past their respective brushes. The gaps in rings 61 and 62 are so oriented relatively to each other and to their associated brushes 65 and 66 that brush 65 registers with the gap in ring 61 when the sewing machine needle is in its "down" position and the brush 66 registers with the gap in ring 62 when the needle is in its "up" position. For more detailed physical showings and more extensive descriptions of the synchronizer and mechanical aspects of the power transmission, reference should be made to U.S. Patent 2,961,591, entitled "Automatic Needle Positioning Mechanism."

At the lefthand side of FIGURE 4 there will be seen a pair of conductors 68 which are connected to opposite ends of the primary winding 69 of transformer 70. The lines 68 may be energized from a voltage source through a main power switch, which may be for example the switch 71 shown at the righthand side of FIGURE 1. Transformer 70 is provided with a secondary winding 72 which provides positive polarity full wave rectified current to line 73 through the solid state rectifiers 74, the negative return to the winding center-tap being via line 75. This circuit supplies current for energizing the auxiliary D.C. motor 31, the motor armature being designated as 31a and the motor field as 31b. Additionally, transformer 70 is provided with another secondary winding 76 which supplies positive polarity full wave rectified current to line 77 through the solid state rectifiers 78, the negative return to the winding center-tap being via line 79. This circuit supplies current for energizing the windings of the several control circuit relays designated as 80, 81 and 82.

Relay 80 is the needle position control relay which determines the final stopping position of the needle 27 through its pole 83 by selecting which of the two synchronizer brushes 65 and 66 shall be operative in the circuit, the selection being made through relay 80 "down" position contact 84a and "up" position contact 84b. Pole 85 and contact 86 comprise a holding circuit for relay 80 which maintain the same energized after release of the reversing switch 34. Relay 81 is the dynamic braking relay which operates through its pole 87 and contact 88a to short circuit the auxiliary motor armature 31a when proper needle positioning has been effected. This relay 81 also controls the actuation of motor control relay 82 through its pole 89 and contact 90, relay 82 when energized closing the current circuit for the auxiliary D.C. motor 31 through its pole 91 and contact 92.

Although the full wave rectifier circuit including the winding 76 and the rectifiers 78 provides direct current on line 77 for energizing all of the relays so that energizing current is always available from this rectifier circuit, other considerations actually determine the energization time of the relays. This can be seen by tracing the circuitry from the junction of the rectifiers 78 along conductors 77 and 93 to the treadle switch 32, which is shown in solid line in its open position to correspond to the condition wherein the treadle 24 has been depressed by the operator. Assuming that the operator has released the treadle 24 so that the treadle switch 32 is closed as shown in dashed line, current will flow to the right along conductor 94 through pole 83 and contact 84a of relay 80, along conductor 95 to brush 65. If the synchronizer is in the position illustrated so that the brush 65 registers with the gap in the split-ring 61 then the current continuity is disrupted and no action will occur. This of course corresponds to the condition wherein the needle has stopped in the desired position, for example in its down position. Assuming however that the synchronizer were in a somewhat rotated position so that the brush 65 made contact with the split-ring 61, as for example seen in FIGURE 5, then the current continuity would be traced through the split-ring 61 to the shorting bar 64 and to the center ring 63. From the center ring 63 the current would flow through brush 67 over conductor 96, through the winding 81a of relay 81 to line 79, and back to the center tap of the winding 76. Thus relay 81 would be energized and its poles 87 and 89 would transfer respectively into engagement with contacts 88b and 90.

Figure 6:
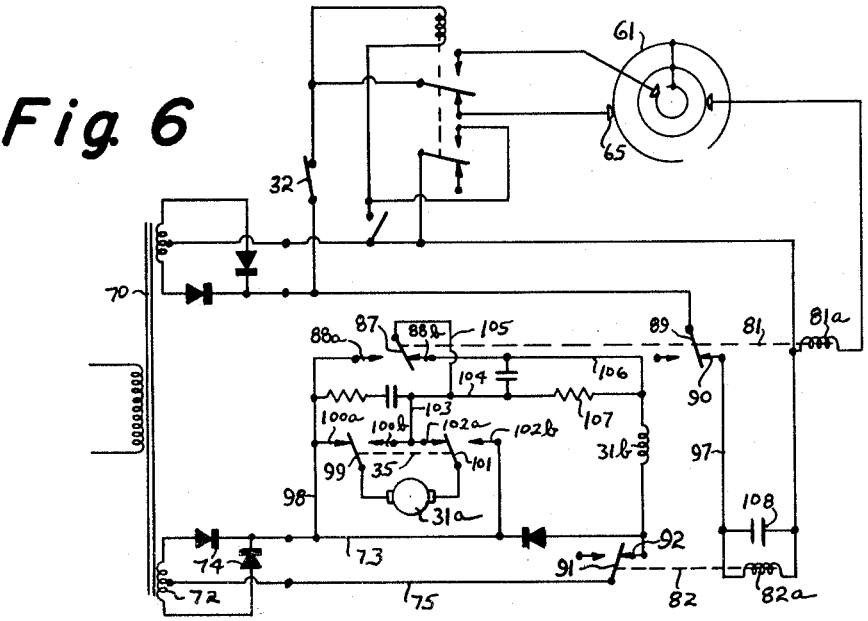

The energization of relay 81 permits relay 82 to be energized because current may now flow from the rectifiers 78 along conductor 77, through pole 89 and contact 90 of relay 81 and then along conductor 97 through the relay winding 82a to conductor 79, and back to the center tap of winding 76. This is seen in FIGURE 6 where pole 91 of relay 82 has transferred into engagement with its contact 92 to complete the auxiliary motor current circuit. It is thus seen that the relay 82 cannot be energized unless the relay 81 has first been energized. By arranging the circuitry in this way it is clear that the auxiliary motor 31 may not be energized unless the treadle switch 32 is closed and the synchronizer is in proper position, since energization of the auxiliary motor 31 requires the energization of the relay 82 and this latter relay may not be energized unless relay 81 has first been energized.

Figure 7:
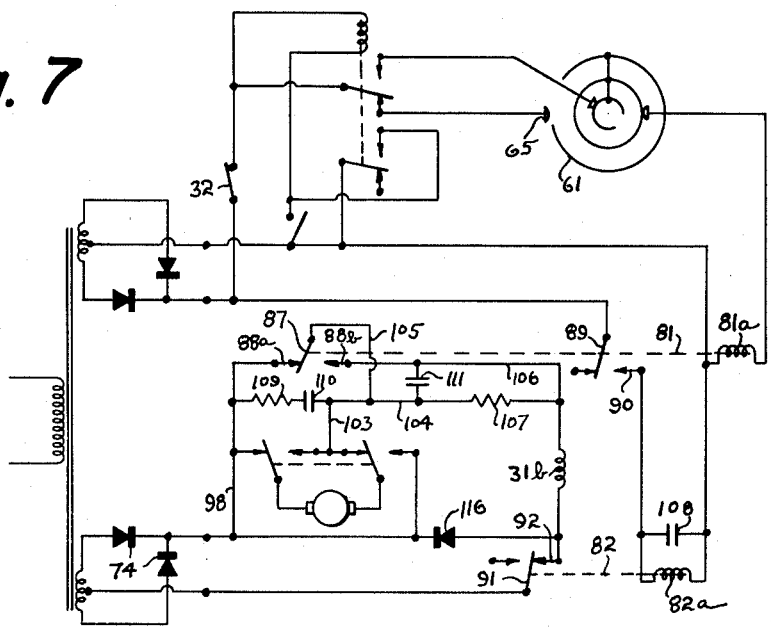

With the circuit conditions as shown in FIGURE 6, the auxiliary motor 31 is activated in the following manner. Current flows from rectifiers 74 to motor armature 31a via lines 73 and 98 and pole 99 and contact 100a of reversing switch 35, through armature 31a and pole 101 and contact 102a of switch 35 to pole 87 and contact 88b of relay 81 via lines 103, 104 and 105, then through line 106 to motor field 31b, contact 92 and pole 91 of relay 82 to line 75 and the center tap of secondary winding 72 of transformer 70. It will be noted that pole 87 and contact 88b of relay 81 short-circuit the resistor 107, the function of which will appear presently. Auxiliary motor 31 is thus energized to cause the sewing machine needle 27 to move to its down position and thus drives the synchronizer until brush 65 registers with the gap in split ring 61, interrupting the flow of energizing current to relay winding 81a and causing relay 81 to drop out, all as seen in FIGURE 7. However, relay 82 will not be de-energized immediately upon the opening of pole 89 and contact 90 of the relay 81 because of the presence of the capacitor 108 which is shunted across the winding 82a of relay 82. The capacitor 108 which was charged during the time that the relay 81 was energized now discharges through the winding of relay 82 and maintains it energized for a finite time interval after relay 81 has dropped out. The fact that the relay 82 does not drop out immediately results in the continued flow of current from the rectifiers 74 to the auxiliary motor field 31b and thus allows for dynamic braking of the auxiliary motor in a manner to be now described.

When relay 81 dropped out, pole 87 transferred into engagement with contact 88a thereby removing the short-circuit across resistor 107 but now providing a short-circuit across the armature 31a of the motor 31. This short-circuit can be traced from line 98 to line 103 via relay pole 87, contact 88a and lines 105 and 104, current flowing from line 104 through resistor 107 and the field winding 31b or the motor. With the armature 31a thus short-circuited while the field 31b remains energized, the motor 31 tends to act as a generator and a rotational force is exerted on the armature 31a in a direction counter to its normally running direction. This causes the armature 31a to be braked very rapidly and it therefore comes to a halt almost immediately, thus preventing coasting with attendant over-travel of the needle 27. The relay 82 now drops out because the current supplied from the capacitor 108 drops below the minimum value required to maintain hold-in, and the current flow to the motor from the rectifiers 74 is terminated because of the open pole and contact 91 and 92 of relay 82. The function of the resistor 107, which is only in the circuit during the interval of dynamic braking of the auxiliary motor 31, is to limit the current flow in the field winding 31b to a non-destructive value which is still sufficiently high to provide good dynamic braking.

It will be observed that resistance-capacitance networks 109, 110, 111 are shunted across pole 87 and terminals 88a and 88b of the relay 81. These networks serve the function of arc-suppression for purposes of insuring long contact life. Similarly, reverse biased diode 116 shunted across the series connected motor armature and field absorbs the reverse potential inductively generated across the motor 31 when relay 82 pole 91 breaks from its contact 92.

With the circuit conditions as shown in FIGURES 4 through 7 and as just described, it is clear that only the split-ring 61 of the synchronizer can control the energization of the relays 81 and 82, and hence the energization of the auxiliary motor 31. This is so because of the contact arrangement of the relay 80. If it is desired that the split-ring 62 should control the energization of the relays 81 and 82, it is necessary that the pole 83 of relay 80 be transferred from its contact 84a to its contact 84b so that current may flow from the treadle switch 32 through the pole 83 and contact 84b along conductor 112 to the split-ring 62 via brush 66. The break in the split-ring 62 being 180 degrees opposite to that of the split-ring 61 it is clear that when the split-ring 62 controls the relay energization it will cause the needle to stop in its up position.

The transfer of the pole 83 of relay 80 from its contact 84a to its contact 84b requires the energization of the relay 80, which under the conditions as shown can never be energized because of the open circuit between the lower end of relay winding 80a and the return line 79. When the conditions are as shown, relay 80 may be energized by closing of the reversing switch 34. Such closing of the reversing switch 34 allows current to be conducted from the treadle switch 32 through the relay 80 winding 80 via line 113, thence along conductor 114 and through the reversing switch 34 to conductor 79. Relay 80 being now energized, the poles 83 and 85 will transfer and engage respectively their contacts 84b and 86. When pole 85 closes on contact 86 a current path for the winding of relay 80 is established as before except that the switch 34 is now bypassed and it may therefore be released without breaking the circuit continuity. The pole 85 and contact 86 therefore function as a holding circuit to provide holding current for the relay 80 and maintain the poles 83 and 85 in their transferred condition. The transfer of pole 83 to its contact 84b establishes the split-ring 62 as the controlling element of the synchronizer in the manner previously described. The needle 27 of the sewing machine 20 will therefore come to rest in its up position.

Figure 8:
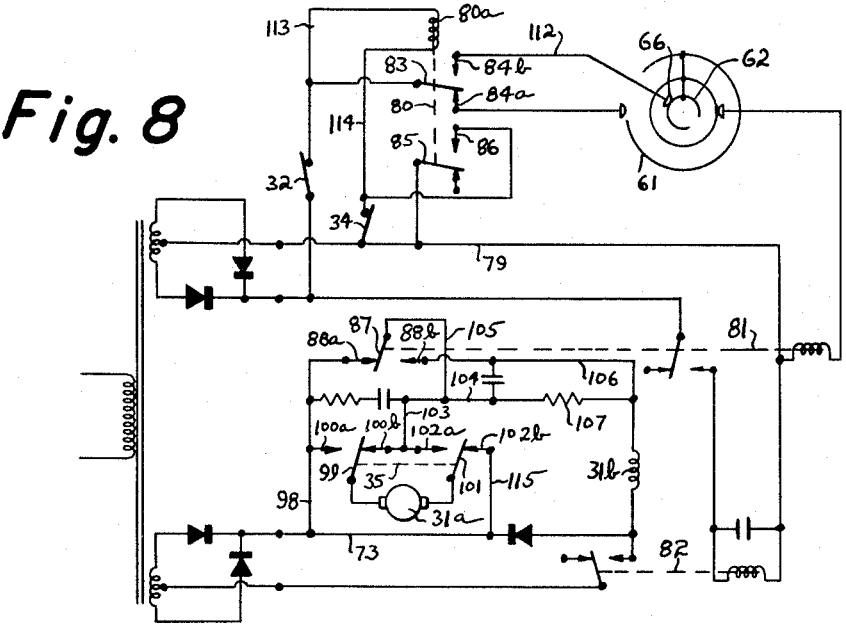

The "up" positioning of the needle however is effected by reversing the driving direction of the auxiliary D.C. motor 31 by reversing the current flow through the armature 31a while maintaining the normal current direction through the field 31b. This is achieved by means of the reversing switch 35 which it will be recalled is actuated by the knee pad 33 and just prior in time to actuation of the switch 34. Thus, the reverse rotation condition of the motor circuit is established prior to motor energization. FIGURE 8 illustrates actuation of the reversing switches 34 and 35 but before relay 80 has as yet transferred its poles to establish the synchronizer split-ring 62 as the position controlling element. It will be observed that in this case current flow through the armature 31a to line 103 will be via conductor lines 73 and 115 and switch 35 contacts 102b and 100b, rather than through line 98 and switch 35 contacts 100a and 102a.

Figure 9:
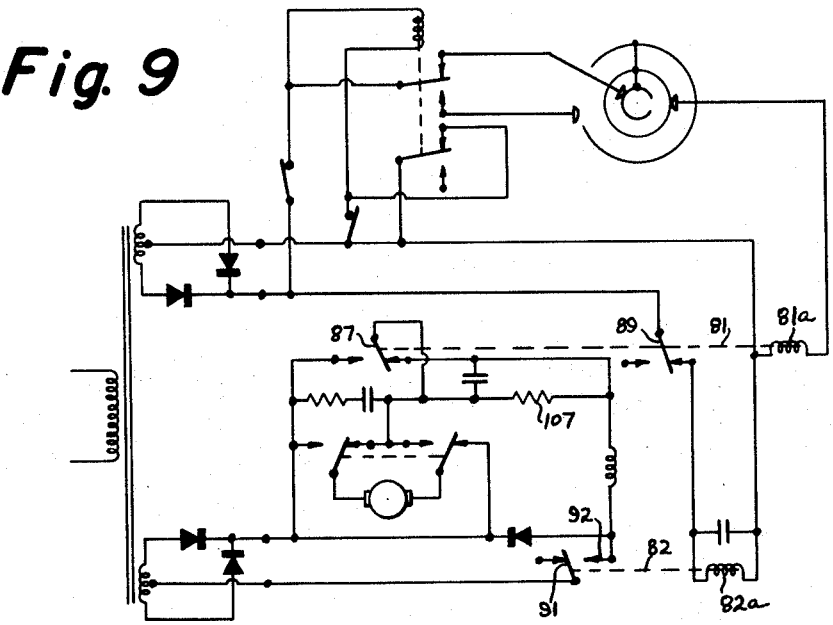

FIGURE 9 illustrates the circuit conditions an instant later when relay 81 has been energized to transfer its poles 87 and 89 to respectively short circuit resistor 107 and energize relay 82, but prior to transfer of relay 82 pole 91.

Figure 10:
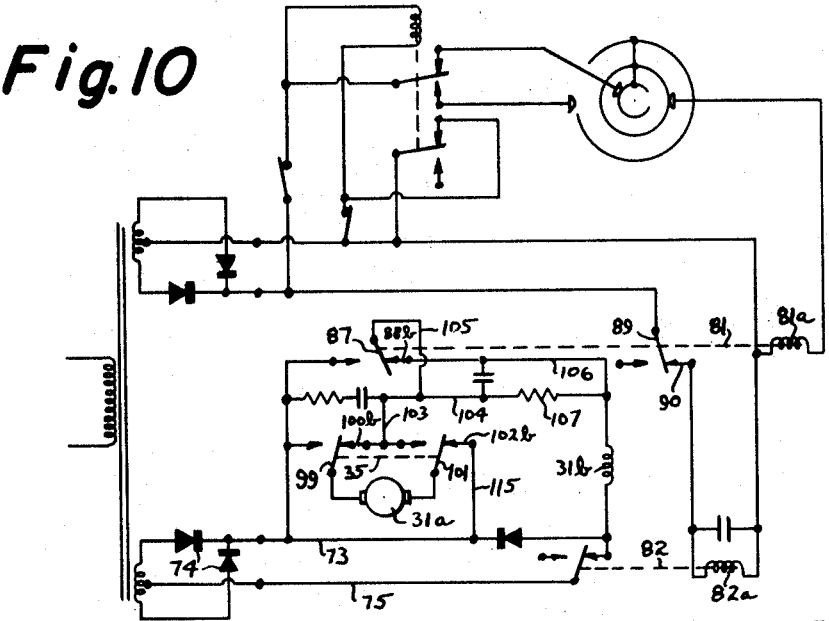

FIGURE 10 shows the circuit conditions immediately following, wherein relay 82 has been energized and its pole 91 has transferred to engage contact 92 and thereby energize the auxiliary motor 31 for reverse rotation.

Figure 11:
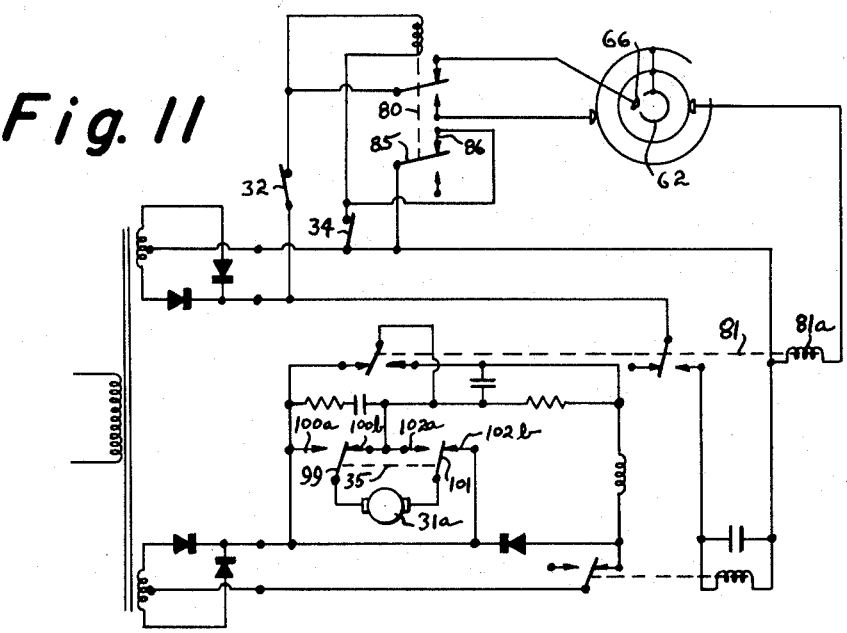

FIGURE 11 illustrates termination of reverse motor due to registry of synchronizer brush 66 with the gap in the "up" position split-ring 62 attended by drop-out of relay 81 to short-circuit the armature 31a and dynamically brake the auxiliary motor 31.

Figure 12:
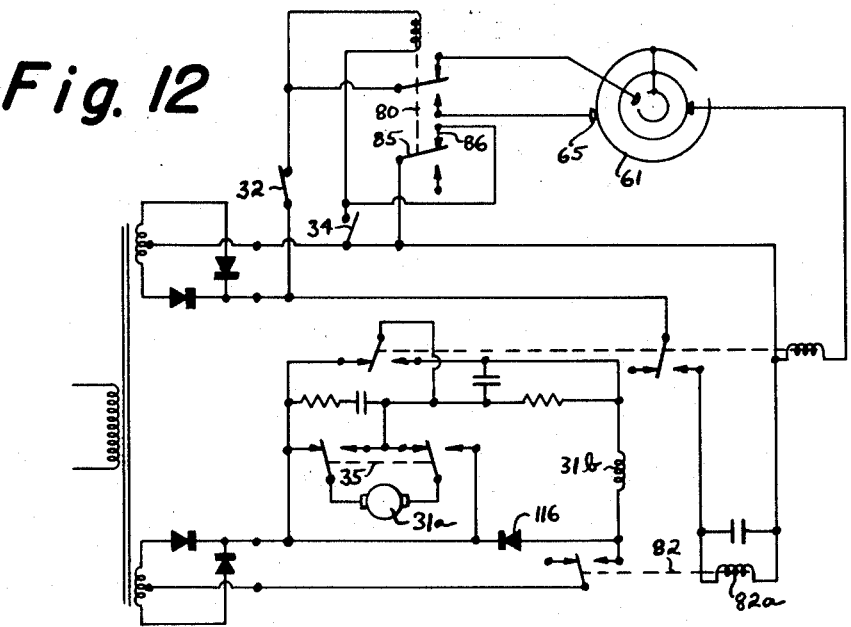

FIGURE 12 shows termination of the cycle by drop-out of relay 82 to de-energize the auxiliary motor 31. Additionally, reversing switches 34 and 35 are shown as retransferred to their normal positions due to release of the knee pad 33. It will be noted however that relay 80 has not been de-energized although switch 34 is open due to the holding current circuit of relay pole 85 and contact 86. This type of operation is of course necessary to prevent the needle 27 from being automatically "down" positioned since drop-out of relay 80 would render synchronizer brush 65 and split ring 61 again controlling in the circuit, and from the conditions of FIGURE 12 it is observed that down positioning would take place. De-energization of relay 80 takes place when the operator thereafter depresses the treadle 24 to initiate the next stitching operation, thereby opening treadle switch 32.

A set of typical components and component values for the elements illustrated in the circuit of FIGURE 4 would be as follows:

| | |
|---|---|
| Relay 81 | C. P. Clare type HG–2A 1000 or equivalent. |
| Relays 80, 82 | C. P. Clare type EK–1074 or equivalent. |
| Resistor 107 | 50 ohms, 100 watts. |
| Resistor 109 | 2 ohms. |
| Capacitor 108 | 20 microfarads. |
| Capacitor 109 | 4 microfarads. |
| Capacitor 111 | 10 microfarads. |
| Silicon diode 74 | 400 volts peak inverse, 1 ampere. |
| Silicon diode 78 | 100 volts peak inverse, .5 ampere. |
| Selenium diode 116 | 800 volts @ .5 ampere. |

| | |
|---|---|
| Transformer 70 | Primary 230 volts A.C. Secondary 72, 460 volts @ 1 ampere center-tapped. Secondary 76, 48 volts @ 200 milliamperes, center-tapped. |
| Motor 31 | 1/20 H.P. 220 volts D.C., series wound, 10,000 r.p.m., Robbins & Myers or equivalent. |

The selection of component elements for the circuitry of FIGURES 4 to 12 involves certain considerations in order that rapid needle stopping times on the order of ten milliseconds may be realized. These considerations are set forth in some detail in the previously referred to U.S. Patent 2,961,591, to which reference may be made.

Finally, while reversing switches 34 and 35 have been illustrated for convenience as being two separate switches commonly actuated in sequence by the knee pad lever terminal portion 60, it is not mandatory that such an arrangement be utilized. It is also contemplated, for example, that the poles and contacts of switch 35 be incorporated into the relay 80 and switch 35 eliminated. Such an arrangement would maintain the circuit conditions of FIGURE 11 even after release of the knee pad 33 to allow opening of switch 34 because the motor reversing poles and contacts formerly associated with switch 35 would be maintained in motor reversing position by the holding circuit of relay 80. This would be immaterial since relay 80 drops out upon initiation of the next stitching operation, and thus "down" positioning conditions would be still automatically achieved for the next stopping time.

This arrangement would be useful with slower acting positioning mechanisms wherein it may be desirable to insure that only momentary closure of reversing switch 34 does not create a condition in which the auxiliary motor first reverses and then reverts to forward running operation. Such condition would not only be contrary to that desired, but also could give rise to very high mechanical impulse conditions in the transmission with the attendant danger of mechanical failure.

Having now described our invention, it will be apparent to persons normally skilled in the art that various changes and modifications may be made from time to time for differing applications without departing from the general principles or real spirit of our invention, and accordingly it is intended to claim the same broadly as well as specifically, as indicated in the appended claims.

What is claimed as new and useful is:

1. In combination, first and second relatively movable members so related that particular positions of said first member always correspond to particular positions of said second member, means associated with one of said members for sensing at least one predetermined position thereof, first and second drive means for non-simultaneously driving one of said members, said first drive means being operable to produce continuous unidirectional motion of said one member in response to the actuation of first control means, said second drive means including a direct current motor automatically activatable and operable in response to said sensing means to drive said member associated with said sensing means to the said sensable predetermined position by motion counted to the said unidirectional motion produced by said first drive means, said motor being thereafter deactivated and dynamically braked to a stop substantially instantaneously by short-circuiting the armature winding under the control of said sensing means.

2. In combination, first and second relatively movable members so related that particular positions of said first member always correspond to particular positions of said second member, means associated with one of said members for sensing at least one predetermined position thereof, first and second drive means for non-simultaneously driving one of said members, said first drive means being operable to produce continuous unidirectional motion of said one member in response to the actuation of first control means, said second drive means including a direct current motor automatically activatable and operable in response to said sensing means to drive said member associated with sensing means to the said sensable predetermined position by motion counter to the said unidirectional motion produced by said first drive means, said motor being thereafter deactivated and dynamically braked to a stop substantially instantaneously by short-circuiting the armature winding under the control of said sensing means, and second control means actuatable by said first control means, said second control means when actuated rendering said sensing means inoperative and when de-actuated rendering said sensing means operative.

3. In combination, first and second relatively movable members so related that particular positions of said first member always corresponds to particular positions of said second member, means associated with one of said members for sensing at least one predetermined position thereof, first and second drive means for non-simultaneously driving one of said members, said first drive means being operable to produce continuous unidirectional motion of said one member in response to the actuation of first control means, said second drive means including a direct current motor automatically activatable and operable in response to said sensing means to drive said member associated with said sensing means to the said sensible predetermined position by motion counter to the said unidirectional motion produced by said first drive means, said motor being thereafter deactivated and braked to a stop substantially instantaneously by means under the control of said sensing means.

4. In combination first and second relatively movable members so related that particular positions of said first member always correspond to particular positions of said second member, means associated with said first member for sensing at least two predetermined positions thereof, drive means for driving said first member including a direct current motor and motor energizing means, said motor energizing means being automatically activatable by said sensing means to cause said motor to drive said first member to a particular one of the said at least two sensable predetermined positions whenever the sensed position of said first member is different from said particular one of the said predetermined positions, manually actuatable first control means operative when actuated to reverse the rotational direction of said motor and cause the motor to drive said first member to another one of the said at least two sensable predetermined positions under the control of said sensing means, said motor in both cases being thereafter dynamically braked to a stop substantially instantaneously by short-circuiting the motor armature winding under the control of said sensing means, and second control means for selectively disabling said sensing means and thereby preventing the activation of said motor energizing means.

5. In combination first and second relatively movable members so related that particular positions of said first member always correspond to particular positions of said second member, means associated with said first member for sensing at least two predetermined positions thereof, drive means for driving said first member including a direct current motor and motor energizing means, said motor energizing means being automatically activatable by said sensing means to cause said motor to drive said first member to a particular one of the said at least two sensable predetermined positions whenever the sensed position of said first member is different from said particular one of the said predetermined positions, manually actuatable first control means operative when actuated to reverse the rotational direction of said motor and cause the motor to drive said first member to another one of the said at least two sensable predetermined positions under the control of said sensing means, said motor in both cases being thereafter braked to a stop substantially instantaneously by means under the control of said sensing means, and second control means for selectively disabling said sensing means and thereby preventing the activation of said motor energizing means.

6. The apparatus according to claim 5 wherein said manually actuatable first control means includes a pair of switches, one of said switches when actuated conditioning said motor for reverse rotation and the other of said switches conditioning said sensing means to cause said motor to drive said first movable member to the said another of the said at least two sensable predetermined positions, the motor conditioning one of said switches being effective prior to the sensing means conditioning switch.

7. The apparatus according to claim 6 wherein said pair of switches are physically and electrically independent of one another but are commonly actuatable.

8. The apparatus according to claim 6 wherein said pair of switches are part of a single composite switch structure and are commonly actuatable and deactuable.

9. In combination first and second relatively movable members so related that particular positions of said first member always correspond to particular positions of said second member, means associated with said first member for sensing at least two predetermined positions thereof, drive means for driving said first member including a motor and motor energizing means, said motor energizing means being automatically activatable by said sensing means to cause said motor to drive said first member to a particular one of the said at least two sensable predetermined positions whenever the sensed position of said first member is different from said particular one of the said predetermined positions, manually actuatable first control means operative when actuated to reverse the rotational direction of said motor and cause the motor to drive said first member to another one of the said at least two sensable predetermined positions under the control of said sensing means, said motor in both cases being thereafter braked to a stop substantially instantaneously by means under the control of said sensing means, and second control means for selectively disabling said sensing means and thereby preventing the activation of said motor energizing means.

10. In combination, first and second relatively movable members so related that particular positions of said first member always correspond to particular positions of said second member, means associated with said first member for sensing at least two predetermined positions thereof, first and second drive means for non-simultaneously driving said first member, said first drive means being operable to produce continuous unidirectional motion of said first member in response to the actuation of first control means, said second drive means including a direct current motor automatically activatable and operable in response to said sensing means to cause said motor to drive said first member to a particular one of the said at least two sensable predetermined positions by unidirectional motion in the same sense as is produced by said first drive means whenever the sensed position of said first member is different from said particular one of the said predetermined positions, manually actuatable control means operative when actuated to cause the motor to counter-rotate to drive said first member in the opposite sense to that produced by said first drive means to drive said first member to another one of the said at least two sensable predetermined positions under the control of said sensing means, said motor in both cases being thereafter dynamically braked to a stop substantially instantaneously by short-circuiting the motor armature winding under the control of said sensing means.

11. In combination, first and second relatively movable members so related that particular positions of said first member always correspond to particular positions of said second member, means associated with said first member for sensing at least two predetermined positions thereof, first and second drive means for non-simultaneously driving said first member, said first drive means being operable to produce continuous unidirectional motion of said first member in response to the actuation of first control means, said second drive means including a direct current motor automatically activatable and operable in response to said sensing means to cause said motor to drive said first member to a particular one of the said at least two sensable predetermined positions by unidirectional motion in the same sense as is produced by said first drive means whenever the sensed position of said first member is different from said particular one of the said predetermined positions, manually actuatable control means operative when actuated to cause the motor to counter-rotate to drive said first member in the opposite sense to that produced by said first drive means to drive said first member to another one of the said at least two sensable predetermined positions under the control of said sensing means, said motor in both cases being thereafter dynamically braked to a stop substantially instantaneously by short-circuiting the motor armature winding under the control of said sensing means, and additional control means for selectively disabling said sensing means and thereby preventing the activation of said motor.

12. For use with a sewing machine having a stitching mechanism which includes a rotatable spindle shaft drivingly coupled to a reciprocable needle bar so that particular positions of the spindle shaft always correspond to particular positions of the needle bar, the combination comprising, means couplable to said spindle shaft for sensing at least two predetermined positions thereof, first and second drive means for non-simultaneously driving said spindle shaft, said first drive means being operable to produce continuous unidirectional motion of said spindle shaft in response to the actuation of first control means, said second drive means including a direct current motor automatically activatable and operable in response to said sensing means to cause said motor to drive said spindle shaft to a particular one of the said at least two sensable predetermined positions by unidirectional motion in the same sense as is produced by said first drive means whenever the sensed position of said spindle shaft is different from said particular one of the said predetermined positions, manually actuatable control means operative when actuated to cause the motor to counter-rotate to drive said spindle shaft in the opposite sense to that produced by said first drive means to drive said first member to another one of the said at least two sensable predetermined positions under the control of said sensing means, said motor in both cases being thereafter dynamically braked to a stop substantially instantaneously by short-circuiting the motor armature winding under the control of said sensing means.

References Cited by the Examiner

UNITED STATES PATENTS

| | | |
|---|---|---|
| 1,305,594 | 6/19 | Furlow. |
| 2,958,302 | 11/60 | Frankel et al. 112—219 |
| 2,961,591 | 11/60 | Frank et al. 112—219 X |
| 2,967,499 | 1/61 | Cohen 112—219 |

FOREIGN PATENTS

| | | |
|---|---|---|
| 527,908 | 6/31 | Germany. |
| 910,023 | 4/54 | Germany. |

JORDAN FRANKLIN, *Primary Examiner.*

THOMAS J. HICKEY, ROBERT V. SLOAN, *Examiners.*